United States Patent Office 3,265,734
Patented August 9, 1966

3,265,734
QUATERNARY AMMONIUM SALTS OF HALOMETHYL DIPHENYL ETHERS
Eugene Kraiman, Cedar Grove, N.J., and Arthur F. Hasson, Woodside, and Edwin L. Sukman, New York, N.Y., assignors to Sun Chemical Corporation, New York, N.Y., a corporation of Delaware
No Drawing. Filed Apr. 24, 1963, Ser. No. 275,208
7 Claims. (Cl. 260—567.6)

This invention relates to new quaternary ammonium compounds. More particularly, this invention relates to quaternary ammonium compounds produced from a tertiary amine and a halomethyl or poly(halomethyl) diphenyl ether.

The compounds of this invention find use as highly efficient germicides especially in the range of carbon lengths of less than about 14 in an alkyl group of tertiary amine reactant. The compounds of this invention are also useful as herbicides, fungicides, anti-static agents, surface active agents, corrosion inhibitors and ion-exchange resins and to impart electrical conductivity to substrates such as paper.

The compounds of this invention can be employed either alone or in a solvent and if in a solvent, used ultimately as a spray or in an inert coating as for example, a paint. In any case the degree of effectiveness of these quaternary ammonium compounds is of a uniform high quality.

The compounds of this invention are polymeric or monomeric depending upon the reactants employed in their formation. The monomeric compounds are represented by the formula:

Formula I

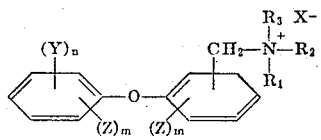

wherein the Z's are the same or different and are halogen such as chlorine, bromine and the like; $m$ is an integer from 0 to 4 inclusive; Y is hydrogen or a quaternary ammonium radical having the formula:

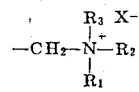

wherein $R_1$, $R_2$ and $R_3$ are as defined below; $n$ is an integer equal to one when Y is hydrogen and when Y is a quaternary ammonium radical, $n$ is 1 or 2; $R_1$ and $R_2$ are the same or different and can together form a heterocyclic ring with N and when not forming part of a ring are alkyl having from 1 to 6 carbon atoms inclusive, e.g., methyl, ethyl and isopropyl, hydroxy lower alkyl or low molecular weight alkoxylated ethers thereof; $R_3$ is alkyl having from 4 to 18 carbon atoms inclusive and preferably from 6 to 14 carbon atoms inclusive; and the $X^-$ anion is halogen such as chlorine, bromine and the like, a free base such as hydroxide, or other anion of a water soluble acid which yields water soluble salts such as nitrate, sulfate, methosulfate, ethosulfate, phosphate, ortho-phosphate, metaphospate, pyrophosphate, formate, acetate, lactate, tertrate, citrate and the like.

The compounds of Formula I wherein Y and Z are hydrogen, $R_1$ and $R_2$ are methyl, the $X^-$ anion is as described above, and $R_3$ is alkyl having from about 9 to about 12 carbon atoms have been found to be very effective germicides. These compounds, having $R_3$ alkyl radicals as listed below, were tested for phenol coefficient using *Salmonella typhosa* with the following results:

| $R_3$ carbon chain length: | Phenol coefficient |
|---|---|
| 9 | 300 |
| 10 | 400 |
| 12 | 200 |

As can be seen from the results of the above test, the compounds of this invention have a good germicidal activity in the range of 9 to 12 $R_3$ carbon atoms which is not true of most presently used quaternary ammonium salt germicides.

The polymeric quaternary compounds of this invention are represented by the formula:

Formula II

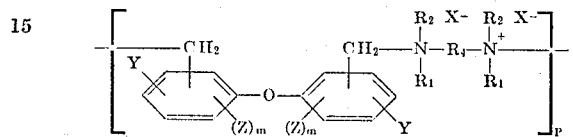

wherein $R_1$, $R_2$ Z, $X^-$ and $m$ are as defined above; P is a number greater than 1 and $R_4$ is alkylene having from 1 to about 10 carbon atoms such as ethylene, trimethylene, tetramethylene, 2-butenylene and the like; aromatic or substituted aromatic such as xylylene and halo-substituted xylylene; oxy-bis-benzyl; or substituted oxy-bis-benzyl having the formula:

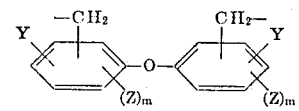

wherein Z and $m$ are as defined above. Y's are the same or different and are hydrogen or quaternary ammonium radicals having the formula:

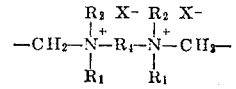

wherein $R_1$, $R_2$ and $R_4$ are as otherwise defined above. Thus when Y is not hydrogen, a cross-linked polymer is defined wherein Y is attached to an aromatic ring of a different polymer chain in place of hydrogen.

The monomeric products shown by Formulae I are prepared by reacting a halomethyl diphenyl ether and a tertiary amine. The polymeric products as shown by Formula II are prepared from a bis-tertiary amine or poly tertiary amine and a bis-halomethyl diphenyl ether or a poly halomethyl diphenyl ether.

The tertiary amines employed as reactants in this invention are represented by the formula:

Formula IV

wherein $R_1$ and $R_2$ are the same or different and are alkyl having from 1 to 6 carbon atoms such as methyl, ethyl, isopropyl and the like, or hydroxy lower alkyl and low molecular weight alkoxylated ethers thereof. The radicals $R_1$ and $R_2$, shown by Formula IV, can also together form a hetorocycle ring with the nitrogen atom. $R_3$ is an alkyl radical having from 4 to 18 carbon atoms inclusive. The nitrogen-containing hetrocyclic tertiary amines which can be employed as reactants in this invention include N-substituted piperidines, morpholines and the like.

The bis-tertiary amines which are reacted either with a bis-halomethyl diphenyl ether to form the polymeric quaternary compound shown by Formula II or with a mono-halomethyl diphenyl ether to form the monomeric quaternary shown by Formula I when Y is a quaternary ammonium radical are represented by the formula:

Formula V

wherein $R_1$, $R_2$, and $R_4$ are as defined above. In addition, polyfunctional tertiary amines are used to produce cross-linked polymers.

The halomethyl diphenyl ethers which are employed to produce the products of this invention are represented by the formula:

Formula VI

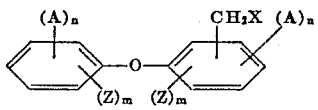

wherein X, Z and $m$ are as defined above; A's are the same or different and are hydrogen or halomethyl radical; $n$ is one for A being hydrogen and when A is a halomethyl radical; $n$ is 1 or 2.

As explained previously, when one A is a halomethyl radical and the other A is hydrogen and the compound is reacted with a bis-tertiary amine, the linear polymeric product shown by Formula II is formed. If both A's are hydrogen, upon reaction with a tertiary amine, the monomeric product of Formula I is formed. If both A's are halomethyl radicals ($n=1$ or 2), a cross-linked polymer is formed. And finally if either A is a halomethyl radical or both are, a cross-linked polymer will form upon reaction with a poly tertiary amine.

The monomeric quaternary ammonium compounds of this invention are produced by reacting a mono-tertiary amine with either a monohalomethyl diphenyl ether or a bis-halomethyl diphenyl ether. When the mono-halomethyl diphenyl ether is employed, the ratio of amine to ether reactant is from about 0.9 to 1 to about 1.1 to 1. When the bis-halomethyl diphenyl ether is employed the ratio of amine to ether reactant is from about 1.8 to 1 to about 2.2 to 1.

The products of this invention can be mixtures of quaternary ammonium compounds as well as being a product composed of a singular quaternary ammonium salt. The mixtures are produced by reacting a halomethyl diphenyl ether with a mixture of amines as for example a mixture of n-nonyldimethylamine, n-dodecyldimethylamine and n-undecyldimethylamine.

In its preferred form the reaction of this invention is carried out in the presence of a solvent medium. When a crystalline product is preferred, the solvent employed dissolves the reactants but does not dissolve the product. When a solution of the product is preferred, the solvent employed will dissolve both the reactants and the products. The solvents employed in this invention depend upon the reactants used and the desired form of the product. In any case the solvent must not be readily reactive with either the reactants or the products under the process conditions. In some cases, as for example when reacting chloromethyldiphenyl ether with n-decyldimethylamine, the reaction can be accomplished without the aid of a solvent or with the addition of a solvent in later stages. To accomplish reaction without the aid of a solvent, the reactants must be heated to sufficiently high temperature to prevent solidification when the reaction is complete. A temperature of from about 100° C. to about 150° C. is usually sufficient for this purpose. Illustrative of suitable solvents for purposes of this invention are methanol, ethanol, benzyl alcohol, propanol, isopropanol, butanol, acetone, ethyl acetate, dioxan, diethyl ether, water solutions thereof, water and the like. In the case of polymeric products, water should be present or be added during the reaction in order to obtain reasonably high molecular weights.

The normal reaction temperature depends upon the particular reactants employed and usually ranges from about 50° C. to about 150° C. Below about 50° C., the reaction rate is generally quite slow while above about 150 C., there is a possibility of degradation of the product. The reaction pressure is usually maintained at about atmospheric unless a low boiling reactant or solvent is employed in which case the pressure is increased in order to avoid evaporation.

The following examples serve to illustrate the invention and are not to be interpreted as imposing any limitation thereon.

*Example I*

Twenty-two grams of chloromethyldiphenyl ether are added gradually to a mixture of 18.5 grams of n-decyldimethylamine and 40.5 grams of isopropanol with stirring at a temperature of 60° C. to 70° C. After the addition, the reaction is permitted to continue for about 2 hours at 60° C. to about 70° C. until substantial completion. The product is N,N,N,N-dimethyl-(phenoxybenzyl)-n-decylammonium chloride and is recovered as a solution. The conversion to the quaternary ammonium salt, as indicated by titration with silver nitrate is approximately 100 percent. The product has the formula:

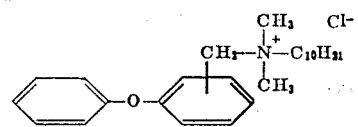

*Example II*

110 grams of chloromethyldiphenyl ether are added gradually to 119 grams of a mixture containing about 25 percent n-nonyldimethylamine, 50 percent n-decyldimethylamine and 25 percent n-undecyldimethylamine in 119 grams of isopropanol with stirring at 90° C. to 100° C. The reaction is permitted to continue for about 9 hours after the addition at a temperature of from 90° C. to 100° C. The product was in solution and was a mixture of about 25 percent N,N,N,N-dimethyl-(phenoxy benzyl)-n-nonylammonium chloride, 50 percent N,N,N,N-dimethyl-(phenoxybenzyl)-n-decylammonium chloride and 25 percent N,N,N,N-dimethyl - (phenoxybenzyl)-n-undecylammonium chloride. The solution of the quaternary ammonium salts as indicated by titration with silver nitrate was 61.2 percent active. The product is composed of a mixture of the compounds having the formulae:

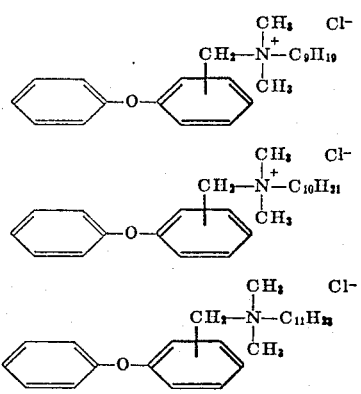

The product had a phenol coefficient, using *Salmonella typhosa*, of 600. 200 parts per million concentration of this quaternary product passed the A.O.A.C. use dilution test with ten kills out of ten against both *Staphylococcus aureus* and *Salomonella choleraesuis*.

*Example III*

A mixture of 10.7 grams of bis-chloromethyldiphenyl ether, 22.7 grams of a mixed alkyldimethyl amine, which alkyl mixture consisted of $C_{13}$, $C_{14}$ and $C_{15}$ n-alkyl groups, and 33.4 grams of isopropanol was refluxed for five hours at a temperature of about 90° to 100° C. The resultant solution was then cooled to room temperature and thereafter titrated with silver nitrate solution which results showed a 98% conversion of the reactants. The product was active as a pre-emergence herbicide when tested on wild oats and wild mustard.

The product is a mixture of the compounds shown by the following formula:

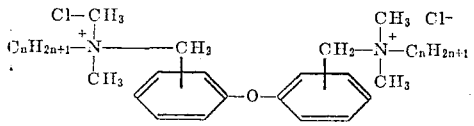

wherein $n$ is an integer from 13 to 15 inclusive.

*Example IV*

A solution of 26.7 grams of bis-chloromethyldiphenyl ether in 30 ml. of acetone was heated to reflux and 14.2 grams of N,N,N',N'-tetramethyl-1,4-diaminobutene-2 was added with stirring. During the addition, water was added as required to maintain the product in solution. After an additional 24 hours of reflux, the acetone was distilled to yield an aqueous solution of polymeric product. A hard, tough continuous film was obtained after the water was evaporated. The product was found effective as an anti-static material and afforded water-soluble coatings which were found to be useful in imparting conductivity to electrostatic copy paper.

The product obtained is represented by the formula:

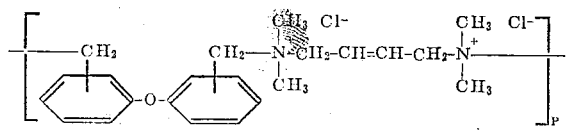

wherein P is an integer greater than 1.

What is claimed is:

1. A compound of the formula:

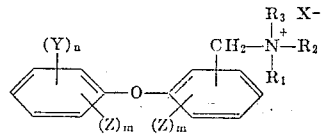

wherein Z is halogen selected from the group consisting of chlorine and bromine; $m$ is an integer from 0 to 4 inclusive; Y is selected from the group consisting of hydrogen and quaternary ammonium radical having the formula:

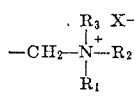

$n$ is an integer equal to 1 when Y is hydrogen and when Y is a quaternary ammonium radical $n$ is an integer from 1 to 2 inclusive; $R_1$ and $R_2$ are selected from the group consisting of methyl, ethyl, isopropyl, hydroxy, lower alkyl and low molecular weight alkoxylated ethers thereof, and radicals wherein $R_1$ and $R_2$ together form a heterocyclic ring with N; $R_3$ is alkyl having from 4 to 18 carbon atoms and $X^-$ is a water soluble anion selected from the group consiting of hydroxide, chlorine, bromine and an anion of a water-soluble acid which yields a water-soluble salt selected from the group consisting of nitrate, sulfate, methosulfate, ethosulfate, phosphate, ortho-phosphate, metaphosphate, pyrophosphate, formate, acetate, lactate, tartrate and citrate.

2. N,N,N,N - dimethyl - (phenoxybenzyl) - n - decyl-ammonium chloride of the formula:

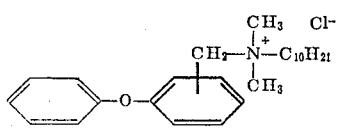

3. N,N,N,N - dimethyl - (phenoxybenzyl) - n - nonyl-ammonium chloride of the formula:

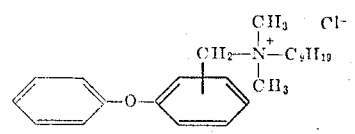

4. N,N,N,N - dimethyl - (phenoxybenzyl) - n - dodecyl-ammonium chloride of the formula:

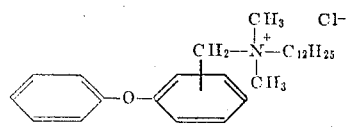

5. N,N,N,N - dimethyl - (phenoxybenzyl) - n - undecylammonium chloride of the formula:

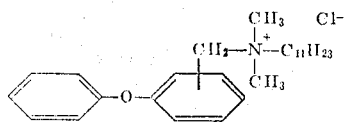

6. The bis-quaternary ammonium compound of the formula:

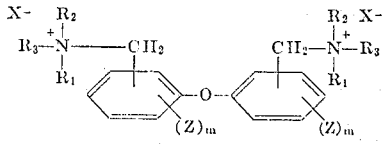

wherein $R_1$, $R_2$, $R_3$, Z, $X^-$ and $m$ are as defined in claim 1.

7. A mixture of bis-quaternary ammonium compounds each having the formula:

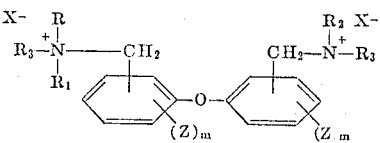

wherein $R_1$, $R_2$, $R_3$, Z, $X^-$ and $m$ are as defined in claim 1.

References Cited by the Examiner

UNITED STATES PATENTS

| | | | |
|---|---|---|---|
| 2,271,378 | 1/1942 | Searle | 260—567.6 XR |
| 2,383,775 | 8/1945 | Craig et al. | 167—30 |
| 2,520,275 | 8/1950 | Du Bois | 260—567.6 |
| 2,666,010 | 1/1954 | Stayner | 167—30 |
| 2,759,020 | 8/1956 | Girod | 260—567.6 |
| 2,759,975 | 8/1956 | Chiddix et al. | 260—567.6 |
| 2,851,378 | 9/1958 | Emmert | 117—154 |
| 3,090,705 | 5/1963 | Miksits | 117—154 |

FOREIGN PATENTS 965,160  2/1950  France.

OTHER REFERENCES

Copp et al., Nature, vol. 165, pp. 601–602 (1950).
Funke et al., Bull. Soc. Chim. France, vol. of 1950, pp. 340–345.
Tomita et al., J. Pharm. Soc. Japan, vol. 73, pp. 760–763 (1953).

CHARLES B. PARKER, *Primary Examiner.*

JULIAN S. LEVITT, JOSEPH P. BRUST, GEORGE A. MENTIS, FLOYD D. HIGEL, *Assistant Examiners.*